United States Patent
Valentine et al.

(10) Patent No.: US 11,378,429 B2
(45) Date of Patent: Jul. 5, 2022

(54) INSERTION MAGNETIC METERS AND METHODS

(71) Applicant: ONICON INC., Largo, FL (US)

(72) Inventors: William S. Valentine, Largo, FL (US); Michael Upham, Largo, FL (US); Kevin Holler, Largo, FL (US); Adam Sheppard, Largo, FL (US)

(73) Assignee: ONICON INCORPORATED, Largo, FL (US)

( * ) Notice: Subject to any disclaimer, the term of this patent is extended or adjusted under 35 U.S.C. 154(b) by 121 days.

(21) Appl. No.: 16/797,814

(22) Filed: Feb. 21, 2020

(65) Prior Publication Data

US 2020/0271490 A1  Aug. 27, 2020

Related U.S. Application Data

(60) Provisional application No. 62/809,252, filed on Feb. 22, 2019.

(51) Int. Cl.
*G01F 1/58* (2006.01)

(52) U.S. Cl.
CPC .............. *G01F 1/584* (2013.01); *G01F 1/586* (2013.01)

(58) Field of Classification Search
CPC ........... G01F 1/584; G01F 1/586; G01F 1/588
See application file for complete search history.

(56) References Cited

U.S. PATENT DOCUMENTS

| | | | | |
|---|---|---|---|---|
| 4,459,858 A | * | 7/1984 | Marsh ...................... | G01F 1/58 73/861.12 |
| 5,036,711 A | * | 8/1991 | Good ........................ | G01F 1/46 73/861.66 |

FOREIGN PATENT DOCUMENTS

| | | | |
|---|---|---|---|
| JP | 2015-203608 A | | 11/2015 |
| JP | 2015203608 A | * | 11/2015 |
| WO | WO 02/063250 A1 | | 8/2002 |
| WO | WO 2004/083651 A1 | | 9/2004 |
| WO | WO 2009/035481 A1 | | 3/2009 |

* cited by examiner

*Primary Examiner* — Peter J MacChiarolo
*Assistant Examiner* — John M Royston
(74) *Attorney, Agent, or Firm* — Blank Rome LLP

(57) ABSTRACT

A magnetic insertion meter is disclosed herein. Disclosed insertion meters include in some examples, a sensor head tube cylinder having a textured front surface and at least two electrodes. Disclosed insertion meters include a textured front surface adapted to move the separation point of a fluid flowing over the sensor head tube towards the upstream surface as compared to the same sensor head tube without the textured front surface. Methods of measuring flow are also disclosed herein using example magnetic insertion meters.

35 Claims, 11 Drawing Sheets

INSERTION MAGNETIC METERS AND METHODS

RELATED APPLICATIONS

This application claims priority to U.S. provisional application 62/809,252, filed on Feb. 22, 2019, the entirety of which is incorporated by reference herein.

FIELD OF USE

This application relates to flow meters and more particularly to magnetic insertion meters.

BACKGROUND

Two of the most important characteristics of a precision flow meter are repeatability and linearity. Repeatability is the ability of a meter to obtain the same results under the same conditions. Linearity is the degree to which a meter's output is linear to the amount of flow being transferred through a pipe or other conduit.

It is difficult to make an accurate meter if it is not repeatable. It is also difficult to calibrate and predict performance in various operating conditions (for example, fluids, temperatures, and pipe types) if it is not linear. Insertion flow meters are typically less accurate than in-line meters because they have worse repeatability and linearity than an in-line meter. This is in part because insertion meters by the nature of their design can only measure a point on the velocity profile, or at lease only a small portion thereof, and this measurement must be correlated to estimate the average velocity of flow through the pipe. The shape of the velocity profile changes with flow, pressure, and temperature, among other factors, which affects the translation of this point measurement to total average velocity. Inline meters, on the other hand, measure across the entire velocity profile enabling an accurate direct measurement of the average velocity of flow through the pipe. Consequently, insertion magnetic meters may typically have an accuracy of +/−2% of reading, whereas in-line meters have accuracies as low as +/−0.2% of reading.

However, insertion meters are advantageous as compared to in-line meters because insertion meters are modular and do not require complete system shutdown for installation and repair. In addition, insertion meters cost less and have a lower installation cost. To install an inline meter, the system has to be shut down, a section of pipe cut out, flanges welded in place and then the meter is mounted between the two flanges. Insertion meters can be mounted though a common ball valve.

Any advancement that enables the improvement of either the repeatability of the accuracy of an insertion meter is extremely valuable.

SUMMARY

In one aspect of the disclosure, a magnetic insertion meter is disclosed having a sensor head cylinder having a textured front surface and at least two electrodes. In another aspect of the disclosure, an insertion meter includes a field coil configured to emit an alternating magnetic field when energized with an alternating current. In yet another aspect of the disclosure, a textured front surface is an upstream surface. In one aspect of the disclosure a textured front surface is at least one of an abrasive on a substrate, an impregnated abrasive, a deposited abrasive, and/or an abrasive layer. In one particular aspect of the disclosure, a textured front surface is sandpaper. In another aspect of the disclosure a textured front surface has a higher roughness than a material forming the sensor head tube.

In one aspect of the disclosure, a textured front surface includes at least one groove. In another aspect of the disclosure, a textured front surface includes two grooves extending along the longitudinal axis of the sensor head cylinder. In one aspect of the disclosure, a textured front surface includes dimples. In another aspect of the disclosure, a plurality of dimples are equally spaced apart from each other. In another aspect of the disclosure, a plurality of dimples form a pattern in which three of the plurality of meters form an equilateral triangle. In one aspect of the disclosure, a textured front surface includes a plurality of columns of dimples. In one aspect of the disclosure, a textured front surface includes from about 3 to about 7 columns of dimples. In another aspect of the disclosure a textured front surface includes dimples. In yet another aspect of the disclosure a textured front surface is adapted to alter the boundary layer of a fluid flowing over the sensor head tube as compared to the same sensor head tube without the textured front surface. In another aspect of the disclosure a textured front surface is adapted to move the separation point of a fluid flowing over the sensor head tube towards the front surface as compared to the same sensor head tube without the textured front surface. In one aspect of the disclosure, a textured surface is a surface contour.

In one aspect of the disclosure, a method of measuring flow is disclosed in which the method includes providing a magnetic insertion meter that includes a sensor head cylinder having a textured front surface and at least two electrodes and measuring the output of said electrodes. In another aspect of the disclosure a textured front surface is at least one of an abrasive on a substrate, an impregnated abrasive, a deposited abrasive, and/or an abrasive layer. In another aspect of the disclosure, a textured front surface includes at least one of dimples and/or grooves.

DETAILED DESCRIPTION

Figure 1:
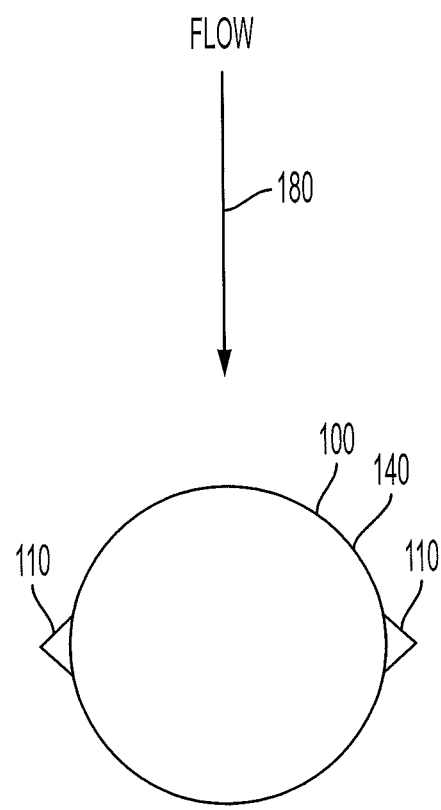
FIG. 1 is a schematic view of an example insertion meter.

FIG. 1 shows a cross section of an insertion meter 100, having the shape of a cylinder, looking down the longitudinal access of an example insertion meter 100. The insertion meter 100 may be, for example, part of the example sensor assemblies described in U.S. application Ser. No. 16/233,915, filed on Dec. 27, 2018, titled "Scalable Monolithic Sensor Assembly, Controller, and Methods of Making and Installing Same," and published as US 2019/0204129, the entirety of which is included herein as Appendix A and also is incorporated by reference herein. The cross section is taken at electrodes 110.

The insertion meter 100, includes a cylindrical sensor head tube 140, that is inserted into the pipe carrying a suitably conductive fluid 180. In operation, the insertion meter 100 generates a magnetic field using field coils energized by an alternating current. The conductor (i.e., the conductive fluid) passing through the magnetic field induces an electric potential and current according to Faraday's law, which is indicative of the flow velocity. The insertion meter 100 measures the electrical potential (voltage or "V") generated by the flow velocity between at least two electrodes. Such a potential difference may be measured, for example, between at least one top electrode and at least one bottom electrode.

For example, the insertion meter 100 may have 2 or more electrodes disbursed from top to bottom of its longitudinal axis. In one particular example the insertion meter 100 may include 1 or more top electrodes, one or more bottom electrodes, and one or more center electrodes. The center electrodes act as an electrical reference, whereas the voltage potential is sampled between pairs of top and bottom electrodes. The two electrodes 110 shown in FIG. 1 share the same longitudinal height. Thus, the electrodes 110, may each be top electrodes, bottom electrodes, or references electrodes. The electrodes 110 shown in FIG. 1 may be electrically connected to form a single electrode or they be electrically isolated from each other to form two independent electrodes. In an example independent configuration in which the electrodes 110 are bottom electrodes, a first potential could be measured between one of the electrodes 110 and a respective top electrode and a second potential could be measured between the other electrode 110 and a different top electrode.

Figure 2:
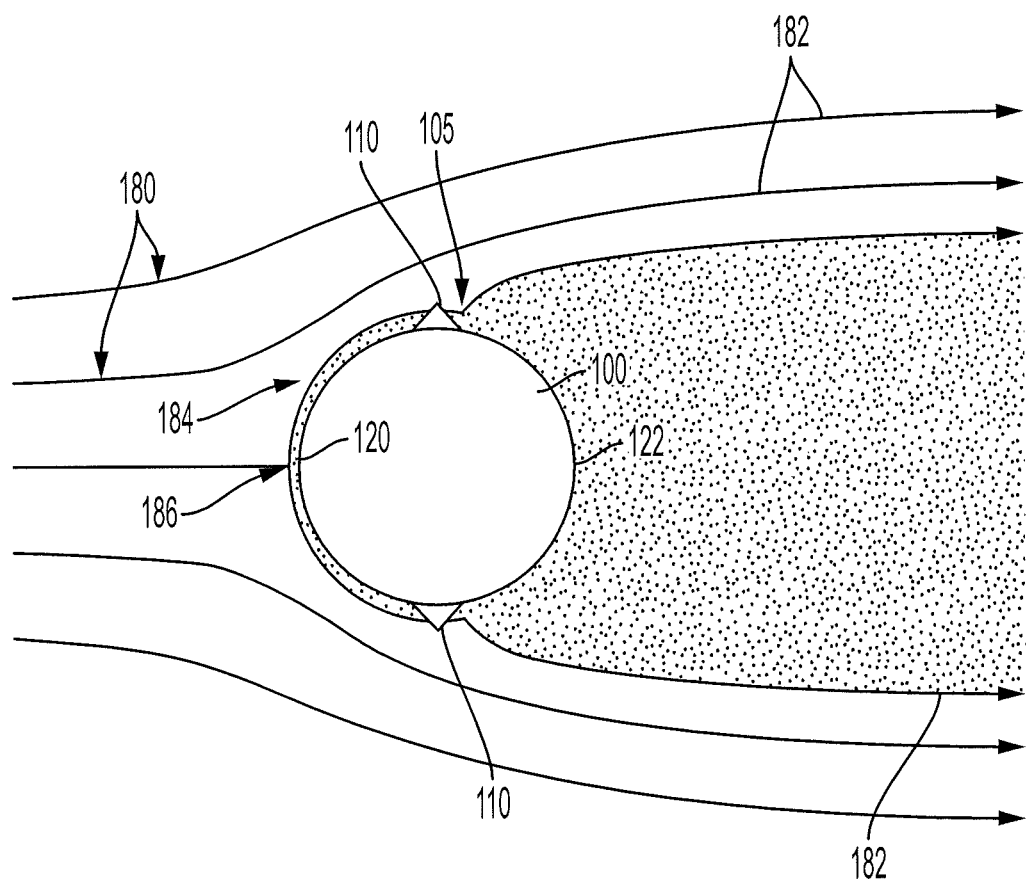
FIGS. 2, 3, 4 and 5 are views like FIG. 1 depicting example flow conditions.

The repeatability of the fluid flow around previous insertion meters 100 can be improved. FIG. 2 shows insertion meters 100 in a flowing fluid 180 at an example velocity in the direction of the arrows 182. If, for example, the flowing fluid 180 at arrows 182 represent a bulk fluid that is turbulent. as shown, the flowing fluid reaches a stagnation point 186, at which the fluid flow is a minimum, when the fluid contacts the front surface 120. The fluid 180 also forms a laminar boundary layer 184 (or boundary layer 184), which is a transition between the stagnation point and the bulk terminal flow 182, as it contacts the front surface 120 facing the oncoming fluid flow. The front surface 120, i.e., the surface facing the oncoming fluid flow, will also be referred to herein as the upstream surface. It should be noted that the if the fluid flow were to reverse directions, the opposing surface would become the upstream surface. The boundary layer 184 becomes unstable or otherwise transitions away from the surface of the insertion meter 100 as it flows towards the back 122, or downstream surface, of the insertion meter 100. This boundary layer transition is indicated as separation point 105.

Figure 3:
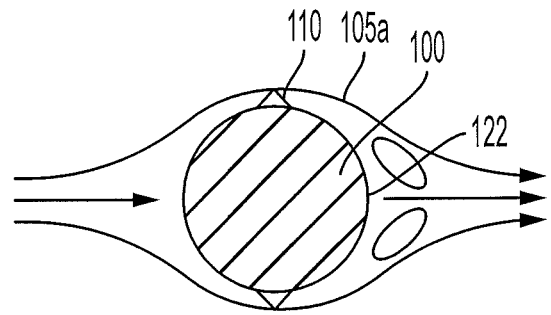
Figure 4:
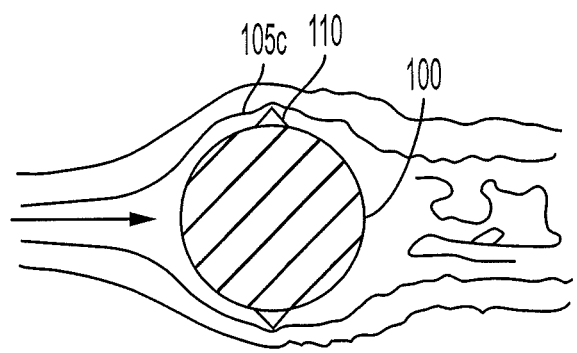
Figure 5:
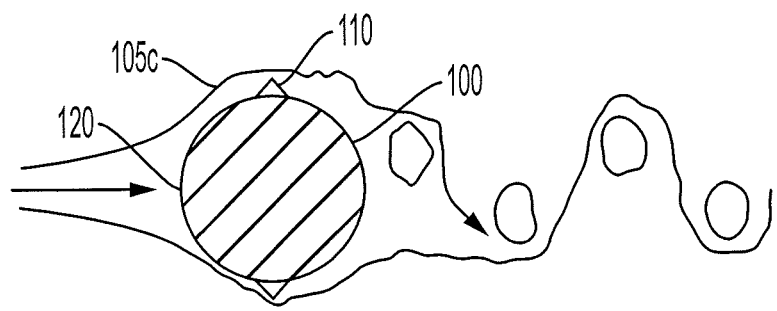

The location of the separation point 105 is not consistent because fluid flow is chaotic and it is affected by changes in the amount of fluid flow across the insertion meter 100, as well as fluid characteristics, for example, velocity of the fluid, temperature, viscosity, density, and surface finish of the cylinder. In addition, the location of the separation point 105 can also change based on whether the flow rate is increasing or decreasing to a given velocity. FIGS. 3 through 5 show three different velocities of the same fluid in increasing order, i.e., the FIG. 5 fluid velocity is higher than the fluid velocity of FIG. 4, which is higher than the fluid velocity of FIG. 3. In FIG. 3, separation point 105a is typically between the electrodes 110 and back 122. In FIG. 4, the velocity of the fluid is greater than that of FIG. 3 and less than that of FIG. 5 and the separation point 105b has shifted to near electrode 110. In FIG. 5, the velocity of the fluid is more than that of FIG. 3 and FIG. 4 and separation point 105c has shifted closer to the front 120 of insertion meter 100, i.e., closer to the direction from which the fluid is flowing. While not being bound by theory, it is believed that the inconsistencies in the boundary layer/separation point 105 (105a, 105b, 105c) location contribute to the decrease in linearity and repeatability experienced with prior insertion meters. That is, an unstable boundary layer at the sensor electrodes 110 can prevent accurate and repeatable results as compared to a more stable boundary layer. For example, based on inconsistencies in the fluid flow or changes in the flow rate, at some conditions the separation point 105a is closer to electrode 110 (whether downstream or upstream) which, in the right conditions, can cause more variance in the measurements taken at electrode 105a. While the separation point 105c of FIG. 5 has be shifted towards front surface 120, the variation in the boundary layer shown between FIG. 3 through FIG. 5 can cause an insertion meter 100 to deviate from calibration.

Figure 6:
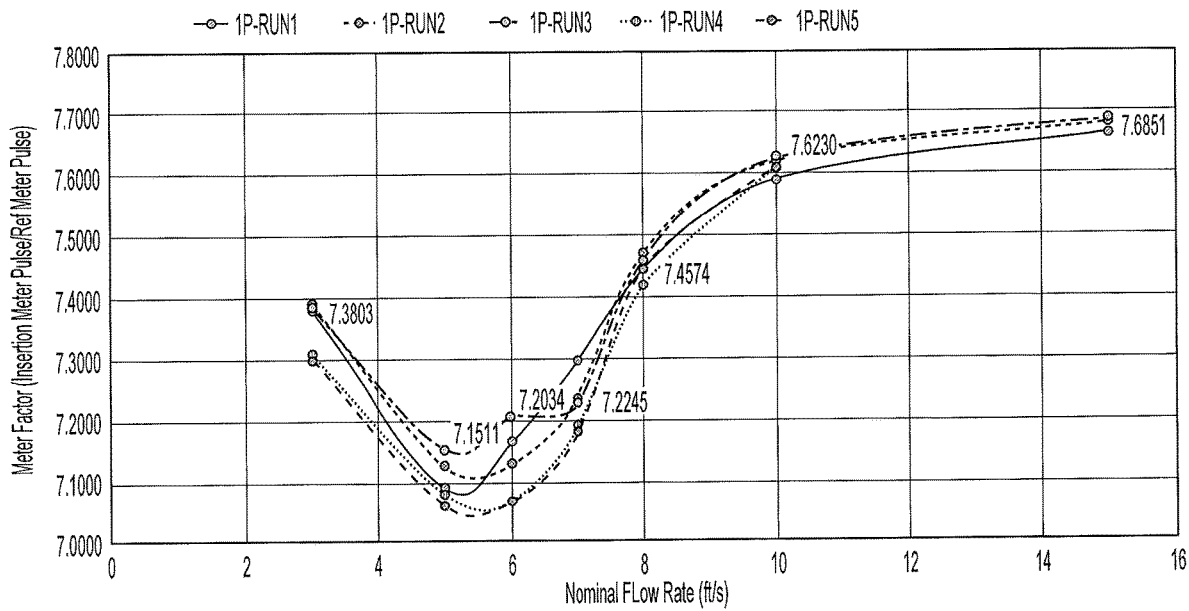
FIG. 6 is a graph depicting meter factor of the meter of FIG. 1.

FIG. 6 shows example meter outputs (1P-RUN1 through 1P-RUN5) of an example insertion meter 100 (FIG. 1) as a graph of meter factor expressed as (LPIP Pulse/Isoil Gal) against nominal flow rate expressed in feet per second (ft/s). The meter factor (or correction factor) is normally dimensionless and is calculated as the ratio of the meter output to value determined by a standard reference meter, for example Insertion Meter Pulse/Reference (Ref) Meter Pulse This can be computed from rate measurements or quantity measurements. The different line traces show repeated test runs of the same insertion meter 100 under the same conditions. It is shown that both repeatability and linearity can be improved. For the test case shown in FIG. 6, the best accuracy achievable using a constant Meter Factor would be +/−3% of reading. For reference, an ideal sensor would produce a constant meter factor regardless of flow rate being measured (horizontal line) meaning the output of the meter is linear with flow and can be easily corrected by multiplying the meter output by a constant meter factor. While an ideal meter is likely not possible, linearity in the meter factor is desired. Linearity simplifies calibration, that is it is more simple to fit a meter reading to a two-point line as compared to a complex curve fit, e.g. like the complex curve of FIG. 6, which would require multiple characterizations. Linearity also simplifies corrections to other operating conditions, improves reproducibility between meters (unit to unit variation), shortens the manufacturing validation cycle to confirm accuracy of the meter, and limits the need to test multiple meters units to determine characteristic curve, that is, fewer units are required to characterize multiple pipes/sizes. If the meter factor is constant, it is assumed, while the value may change, it will be constant for other fluids or flow conditions. It is much easier to determine corrections for other flow conditions and fluids if the relationship is linear.

Attempts to improve reproducibility have previously been made to change the placement of the electrodes by rotating each electrode towards the front 120 of insertion meter 100. This places the electrodes within the laminar boundary layer before it transitions to a turbulent boundary layer. While this could, hypothetically, mitigate some effects of the unstable boundary layer by forcing a consistent velocity profile, it would also result in a decrease of sensor signal, which is not advantageous because it decreases the signal to noise ratio.

Figure 7:
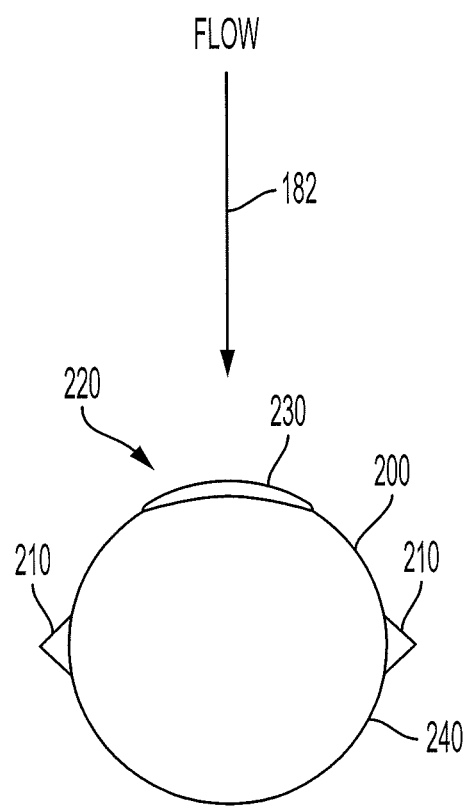
FIG. 7 is a schematic view of an example insertion meter in accordance with disclosed embodiments.

FIG. 7 shows an insertion meter 200 having electrodes 210. Insertion meter 200 and electrodes 210 are the same as insertion meter 100 and electrodes 110, respectively, except that insertion meter 200 includes textured surface 230 on the front 220 of insertion meter 200. While the specific configuration of textured surface 230 may vary based on the particular operating conditions of the insertion meter (e.g., meter circumference, pipe diameter, pipe flow rate, fluid type, fluid velocity, fluid density, etc.), the textured surface 230 should be textured sufficiently to trip or manipulate, the boundary layer such that the separation point (see, e.g., 105, FIG. 2) occurs consistently forward (towards front 220 of insertion meter 200, i.e., towards the source of the flow) of the electrodes 210 for normal operating conditions, and preferably all operating conditions, for the respective insertion meter. In the illustrated embodiment, textured surface 230 should be rougher than the remainder of sensor head tube 240 of insertion meter 200. For example, in one example, textured surface 230 is rougher than the material forming the sensor head tube (e.g., smooth plastic and metal).

As shown in FIG. 7, textured surface 230 may be, for example, a sandpaper or other similar abrasive on a substrate adhered to the sensor head tube 240. Example abrasives on substrates include, for example, sand, glass, aluminum oxide, silicon carbide, emery cloth, pumice, crocus cloth, or the like. While this application discusses the use of paper as a substrate, other flexible substrates, for example, cloth, adhesive, or polymer, may also be used as well as inflexible substrates that are formed or machined to the curvature of the outside circumference of the sensor head tube 240. In addition, the abrasives may further be impregnated or deposited into or onto the surface without a substrate as an abrasive layer. The textured surface 230 may, in one example, extend the length of the sensor head tube 240 or be applied locally in the regions near electrodes 210. The amount of texture will depend on the type of material used, the size and shape of the insertion meter and flow pipe, and the characteristics of the fluid, but should nevertheless be sufficiently textured to manipulate the boundary layer as discussed above.

For example, a sandpaper textured surface 230 may include a 40-80 grit adhesive tape having a substrate thickness of about 0.030 inches and having a width of about 0.360 inches to about 0.400 inches, inclusive, the width being the dimension which would wrap around the circumference of the sensor head tube 240. The sandpaper textured surface may, in one example, be applied centered on the point of stagnation and along the full length of the meter, or effectively the full length of the sensing portion of the meter sensor head tube 240.

Figure 8:
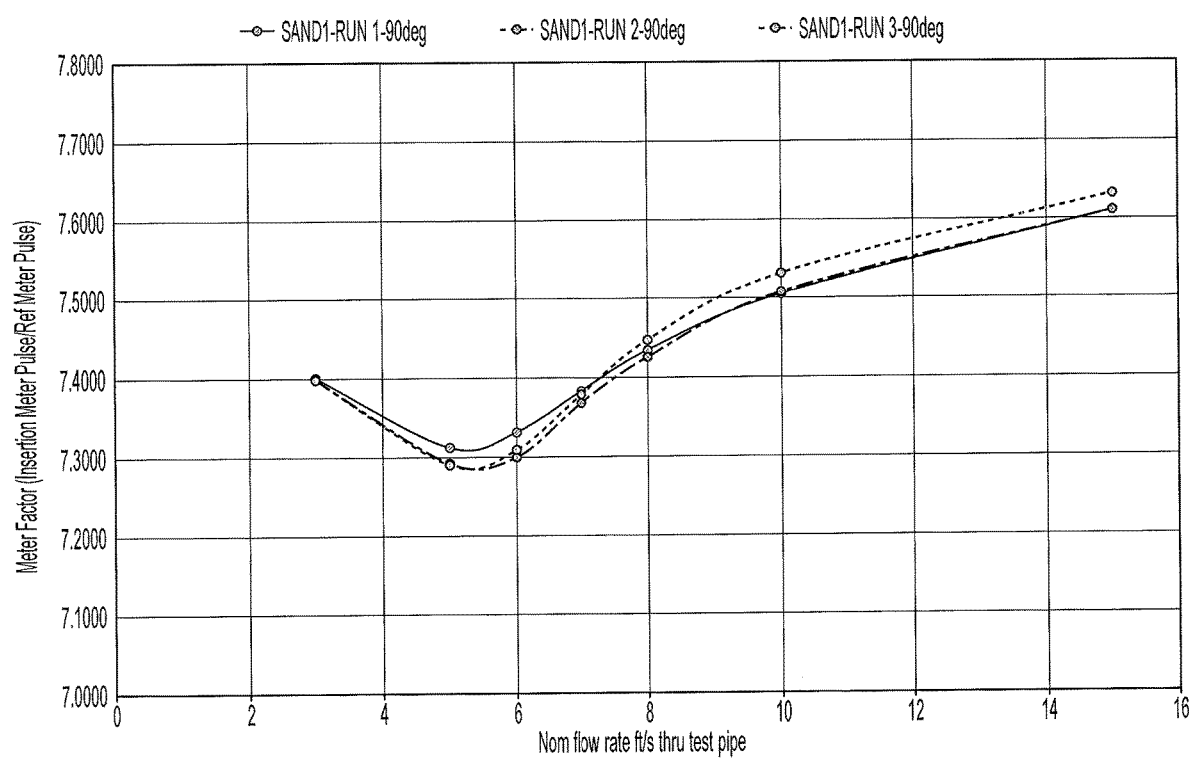
FIG. 8 is a graph depicting meter factor of the meter of FIG. 6.

FIG. 8 shows example meter outputs (SAND1-RUN1-90 deg through SAND1-RUN3-90 deg) of an example insertion meter 200 (FIG. 7) as a graph of Meter Factor expressed as (Meter pulse/Ref Meter Pulse) against nominal flow rate expressed in feet per second (ft/s). The different line traces show repeated test runs of the same insertion meter 200 in the same conditions. It is shown that both repeatability and linearity are improved over that of insertion meter 100 (FIG. 1). The improved linearity simplifies calibration and improves performance in different pipes and fluids.

Figure 9:
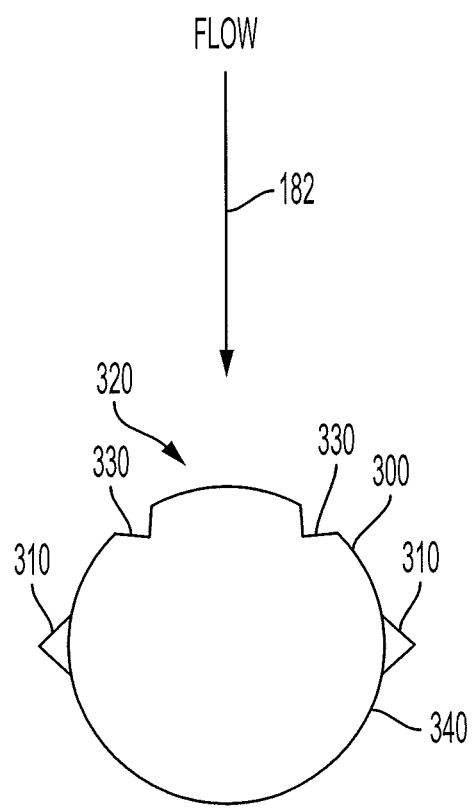
FIG. 9 is a schematic view of an example insertion meter in accordance with disclosed embodiments.

In an alternative example, instead of adding a textured substrate to the surface of insertion meter sensor head tube, the texture is formed directly on the external surface of the sensor head tube. FIG. 9 shows an example embodiment of an insertion meter 300 having electrodes 310. Insertion meter 300 and electrodes 310 are the same as insertion meter 200 and electrodes 210, respectively, except that textured surface of insertion meter 300 includes two longitudinal notches 330 or grooves within the sensor head tube 340 on the front 320 of insertion meter 300. The notches 330 run along the longitudinal axis of the insertion meters 300 between the electrodes 310. The notches 330 also serve to manipulate the boundary layer as discussed above with respect to insertion meter 200.

Figure 10:
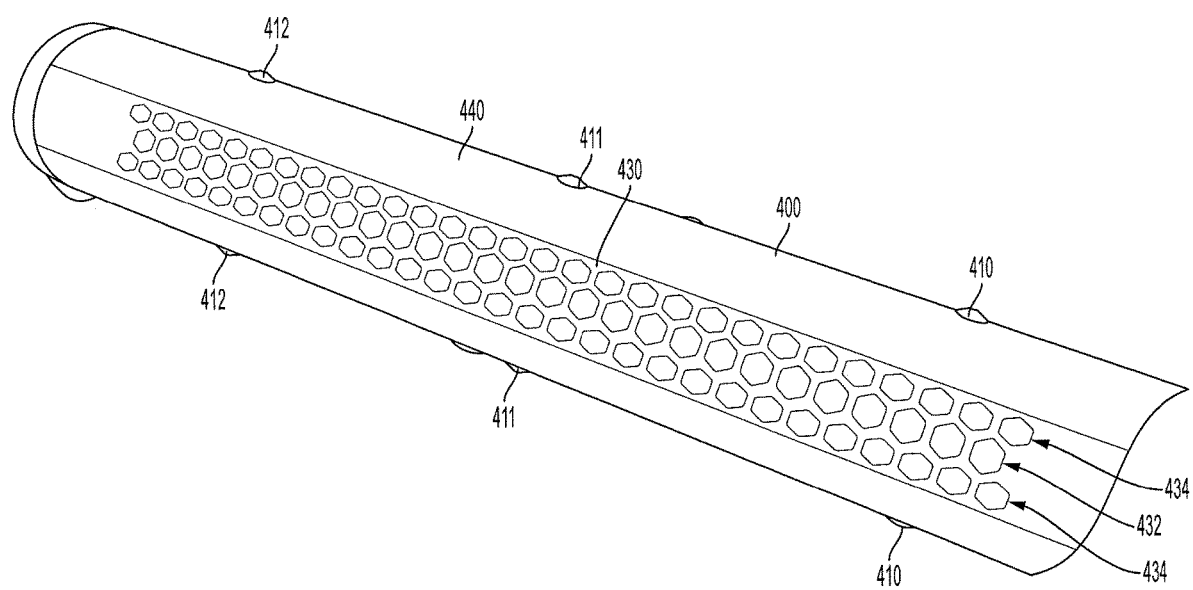
FIG. 10 is a perspective view of an example insertion meter in accordance with disclosed embodiments.

In yet another embodiment, the textured surface includes columns of dimples, for example, those dimples found in typical golf balls. For example, the textured surface may include a plurality of columns of dimples. In one example, the textured surface includes about 3 to about 7 columns of dimples. In another example, the textured surface includes more than 7 columns of dimples. The specific textured surface features discussed above may also be combined. For example, the textured surface may include longitudinal grooves as well as columns of dimples. FIG. 10 shows an insertion meter 400 of similar configuration as insertion meters 300, 200, and 100, including for example having a plurality of electrodes including two top electrodes 410, two center or reference electrodes 411, and two bottom electrodes 412. As shown, however, the textured surface of insertion meter 400 includes dimples 430 formed on or within the sensor head tube 440. The dimples 430 of insertion meter 400 include 3 columns of dimples, with the center column 432 being offset longitudinally from the outer two columns 434 of dimples 430, which results in a pattern of one by two count rows. i.e. alternating between 1 dimple and 2 dimple rows. In one example adjacent dimples 430 form an equilateral triangle such that gap between any two dimples 430 remain consistent. The dimples 430 extend the longitudinal length of the sensor head tube beyond the top electrodes 410 and bottom electrodes 412 in both directions.

The dimples 430 may be formed as an additional surface that is added to the sensor head tube 440 or may be formed within the sensor head tube 440 by, for example, milling or during the formation of the sensor head tube 440 itself. While the size and configuration of each of the dimples can be manipulated to depending on the particular sensor installation, as shown in FIG. 10 as one example, each of the dimples 140 have about a 0.125 inch radius cut with a ¼" ball end mill that is 0.020" deep into sensor head tube 440. And adjacent dimple has about a 0.20 inch gap between them. In addition, the arc length between each hole in a specific row (i.e., a dimple in one outer row 434 to a dimple in the other outer row 434 on the same radial plane) is about 35 to about 36 degrees, inclusive, or specifically as shown about 35.35 degrees. While the dimples 430 are only shown in FIG. 10 partially surrounding the sensor head tube 440, in an alternative example, the dimples 430 may more fully surround, or even completely surround, the sensor head tube 440.

Figure 11:
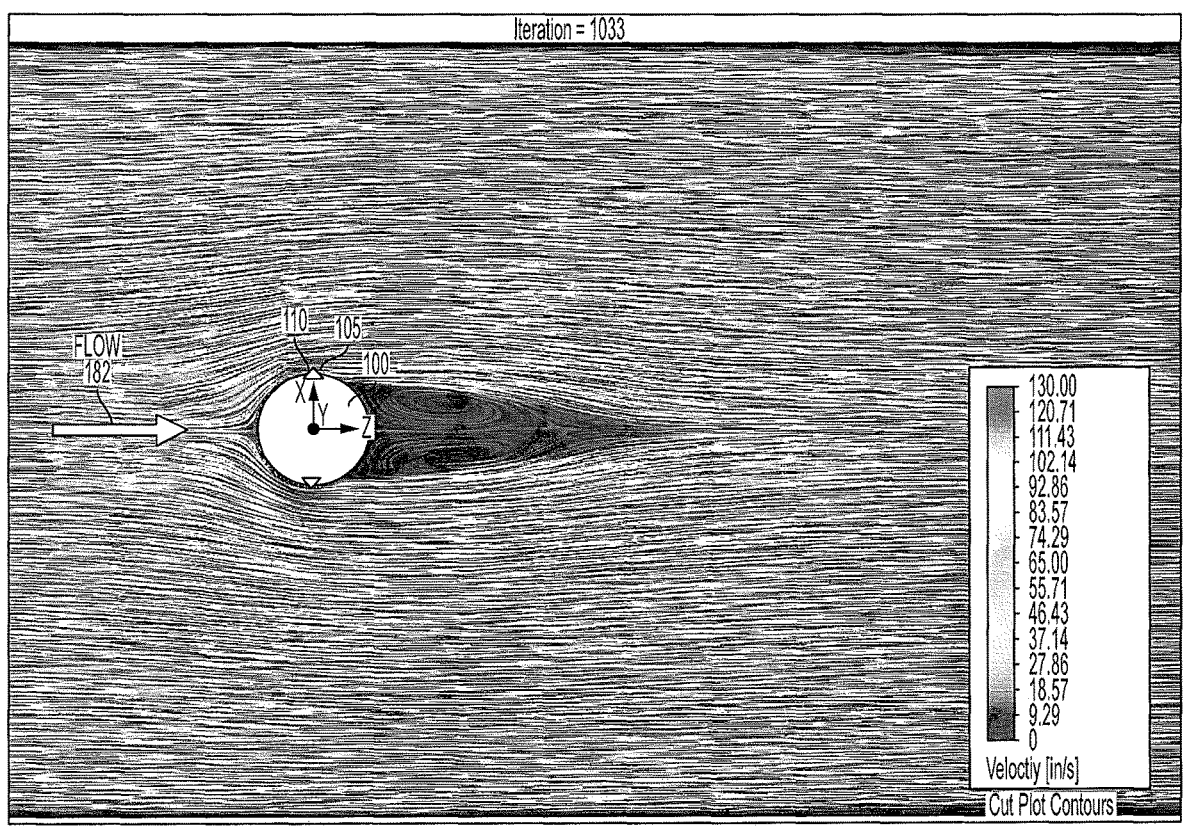
FIGS. 11 and 12 show flow velocity stream models of the insertion meters of FIG. 1 and FIG. 10, respectively.
Figure 12:
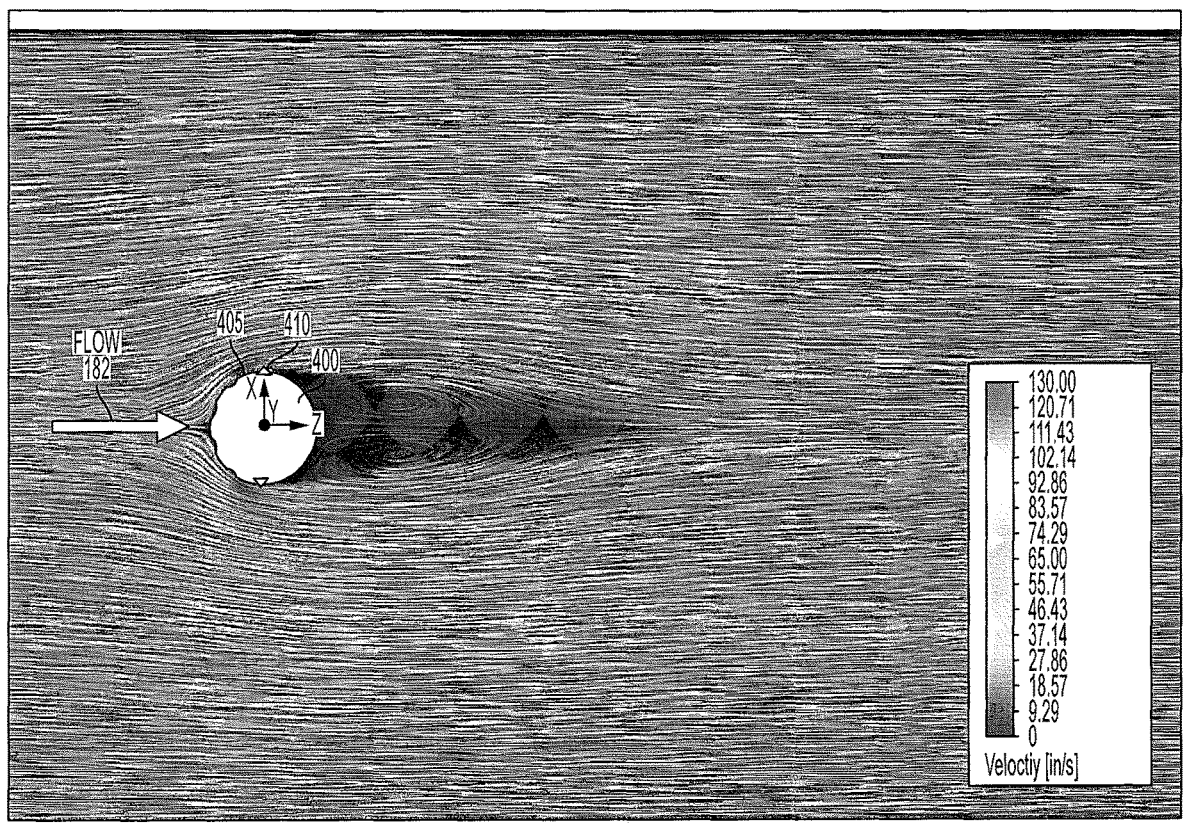

FIGS. 11 and 12 are flow velocity stream models comparing insertion sensor 100 (FIG. 1) with insertion sensor 400 (FIG. 10) in the same flow conditions. In each of FIG. 11 and FIG. 12, the scales have been normalized to 130 in/sec. As shown, separation point 110 is closer to the electrode 105 than separation point 405 with respect to electrode 410.

Figure 13:
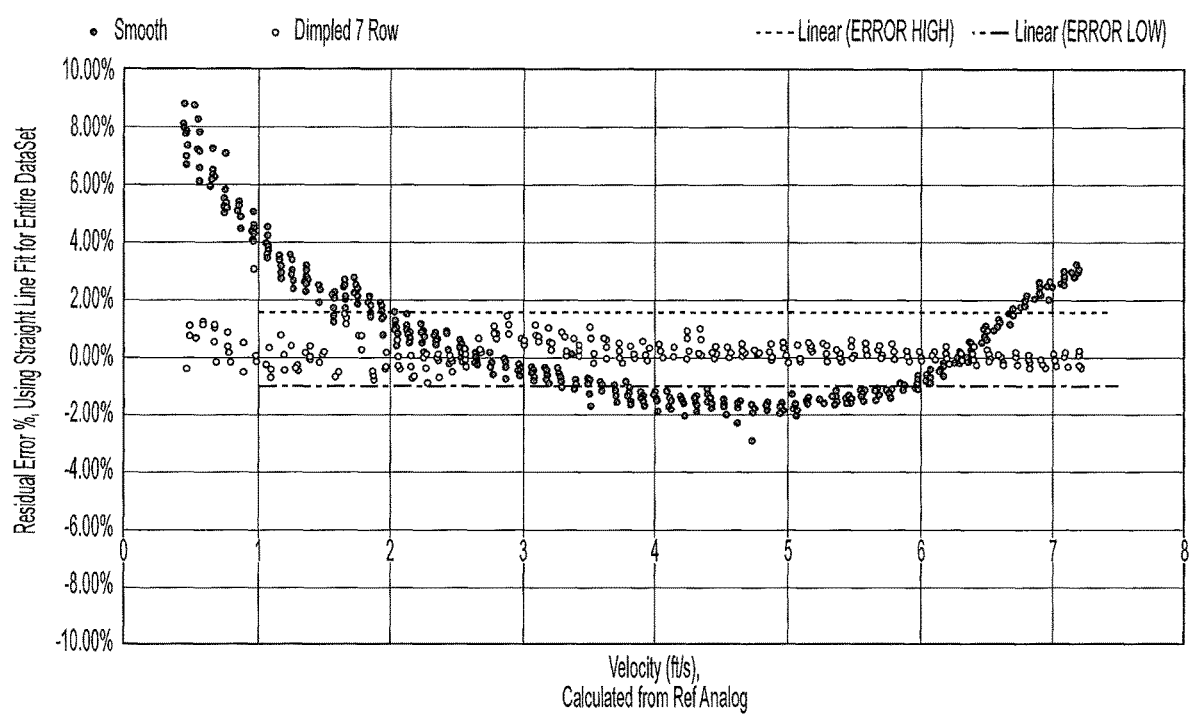
FIG. 13 is a graph depicting meter factor of insertion meters in accordance with disclosed embodiments.

FIG. 13 shows an increase in linearity in the insertion meters with 7 rows of dimples (shown as unfilled purple dots) as compared to the smooth prior meters (shown in filled blue dots). The graph shows the ability to extend the linearity within +/−1.5% of reading down to 1 ft/sec of nominal flow rate with an example insertion meter with seven columns of dimples 430.

In another example embodiment, the cross-sectional shape of the insertion meter is altered to affect the boundary layer/electrode interaction. For example, the insertion meter cross section can be formed in the shape of an oval or a tear drop to improve linearity and repeatability. In such an embodiment the textured surface is itself a surface contour.

A method of measuring flow within a pipe or conduit is also disclosed herein. The methods include providing a magnetic insertion meter that includes a sensor head cylinder having a textured front surface and at least two electrodes. Such insertion meters can be for example, those discussed above with reference to FIGS. 7-9 and their alternative embodiments. In one example embodiment, the method includes measuring the output of said electrodes.

It should be understood that the above description is only illustrative of the invention. Various alternatives and modifications can be devised by those skilled in the art without departing from the invention. Accordingly, the present invention is intended to embrace all such alternatives, modifications and variances which fall with the scope of the appended claims.

What is claimed as new and desired to be protected by Letters Patent of the United States is:

1. A magnetic insertion meter comprising:
   a sensor head cylinder having a textured front surface, wherein the textured front surface has a higher roughness than a material forming the sensor head cylinder and wherein the textured front surface includes at least one groove; and
   at least two electrodes.

2. The insertion meter of claim 1, further comprising a field coil configured to emit an alternating magnetic field when energized with an alternating current.

3. The insertion meter of claim 1 wherein the textured front surface is an upstream surface.

4. The insertion meter of claim 1, wherein the textured front surface is at least one of an abrasive on a substrate, an impregnated abrasive, a deposited abrasive, and/or an abrasive layer.

5. The insertion meter of claim 4, wherein the textured front surface is sandpaper.

6. The insertion meter of claim 1, wherein the textured front surface includes two grooves extending along the longitudinal axis of the sensor head cylinder.

7. The insertion meter of claim 1, wherein the textured front surface includes a plurality of dimples.

8. The insertion meter of claim 7, wherein the plurality of dimples are equally spaced apart from each other.

9. The insertion meter of claim 8, wherein the plurality of dimples form a pattern in which three of the plurality of dimples form an equilateral triangle.

10. The insertion meter of claim 7, wherein the textured front surface includes a plurality of columns of dimples.

11. The insertion meter of claim 10, wherein the textured front surface includes from about 3 to about 7 columns of dimples.

12. The insertion meter of claim 1, wherein the textured front surface is adapted to alter the boundary layer of a fluid flowing over the sensor head tube as compared to the same sensor head tube without the textured front surface.

13. The insertion meter of claim 1, wherein the textured front surface is adapted to move the separation point of a fluid flowing over the sensor head tube towards the front surface as compared to the same sensor head tube without the textured front surface.

14. The insertion meter of claim 1, wherein the textured surface is a surface contour.

15. A magnetic insertion meter comprising:
    a sensor head cylinder having a textured front surface, wherein the textured front surface has a higher roughness than a material forming the sensor head cylinder, wherein the textured front surface includes a plurality of dimples equally spaced apart from each other and the plurality of dimples form a pattern in which three of the plurality of dimples form an equilateral triangle; and
    at least two electrodes.

16. The insertion meter of claim 15, furthercomprising a field coil configured to emit an alternating magnetic field when energized with an alternating current.

17. The insertion meter of claim 15, wherein the textured front surface is an upstream surface.

18. The insertion meter of claim 15, wherein the textured front surface is at least one of an abrasive on a substrate, an impregnated abrasive, a deposited abrasive, and/or an abrasive layer.

19. The insertion meter of claim 18, wherein the textured front surface is sandpaper.

20. The insertion meter of claim 15, wherein the textured front surface includes two grooves extending along the longitudinal axis of the sensor head cylinder.

21. The insertion meter of claim 15, wherein the textured front surface includes a plurality of columns of dimples.

22. The insertion meter of claim 21, wherein the textured front surface includes from 3 to 7 columns of dimples.

23. The insertion meter of claim 15, wherein the textured front surface is adapted to alter the boundary layer of a fluid flowing over the sensor head tube as compared to the same sensor head tube without the textured front surface.

24. The insertion meter of claim 15, wherein the textured front surface is adapted to move the separation point of a fluid flowing over the sensor head tube towards the front surface as compared to the same sensor head tube without the textured front surface.

25. The insertion meter of claim 15, wherein the textured surface is a surface contour.

26. A magnetic insertion meter comprising:
    a sensor head cylinder having a textured front surface, wherein the textured front surface has a higher roughness than a material forming the sensor head cylinder and wherein the textured front surface includes from 3 to 7 columns of a plurality of dimples; and
    at least two electrodes.

27. The insertion meter of claim 26, wherein the plurality of dimples are equally spaced apart from each other.

28. The insertion meter of claim 26, further comprising a field coil configured to emit an alternating magnetic field when energized with an alternating current.

29. The insertion meter of claim 26, wherein the textured front surface is an upstream surface.

30. The insertion meter of claim 26, wherein the textured front surface is at least one of an abrasive on a substrate, an impregnated abrasive, a deposited abrasive, and/or an abrasive layer.

31. The insertion meter of claim 30, wherein the textured front surface is sandpaper.

32. The insertion meter of claim 26, wherein the textured front surface includes two grooves extending along the longitudinal axis of the sensor head cylinder.

33. The insertion meter of claim 26, wherein the textured front surface is adapted to alter the boundary layer of a fluid flowing over the sensor head tube as compared to the same sensor head tube without the textured front surface.

34. The insertion meter of claim 26, wherein the textured front surface is adapted to move the separation point of a fluid flowing over the sensor head tube towards the front surface as compared to the same sensor head tube without the textured front surface.

35. The insertion meter of claim 26, wherein the textured surface is a surface contour.

\* \* \* \* \*